F. HUNZIKER.
LIQUID GAGE.
APPLICATION FILED APR. 24, 1915.
1,210,385.
Patented Dec. 26, 1916.
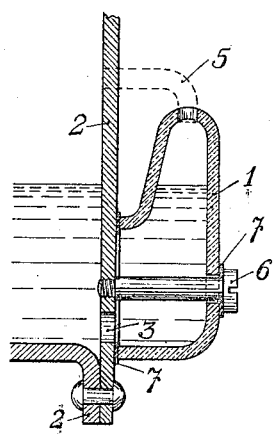
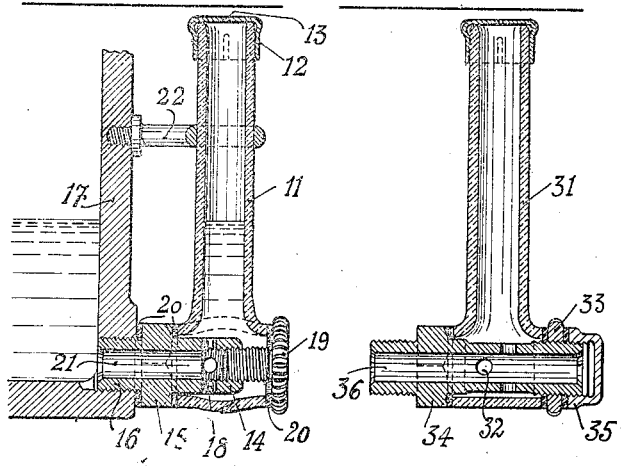
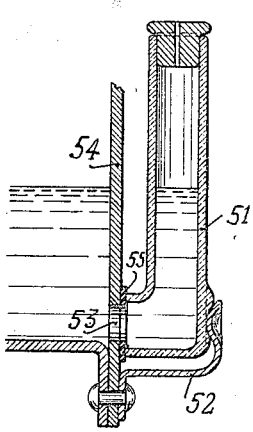
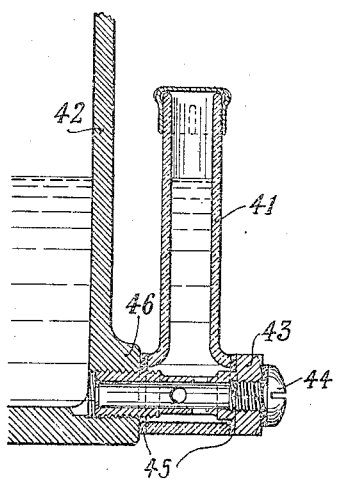
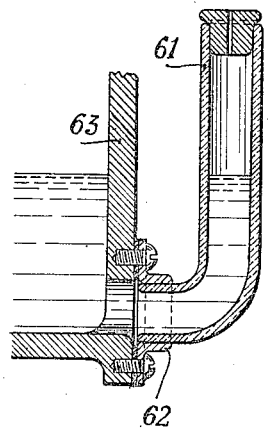
Inventor.
Franz Hunziker

UNITED STATES PATENT OFFICE.

FRANZ HUNZIKER, OF LUCERNE, SWITZERLAND.

LIQUID-GAGE.

1,210,385.　　　　　Specification of Letters Patent.　　Patented Dec. 26, 1916.

Application filed April 24, 1915. Serial No. 23,675.

*To all whom it may concern:*

Be it known that I, FRANZ HUNZIKER, mechanical engineer, a citizen of the Swiss Confederation, residing at Casimir Pfyferstrasse No. 20, Lucerne, Switzerland, have invented new and useful Improvements in Liquid-Gages, of which the following is a specification.

The present invention relates to a gage for indicating the level of any liquid in closed receptacles such as oil-chambers of bearings, of crank- or gear-cases, of barrels, of containers of oil, lubricants, water and so on.

The object of the present invention is to provide a gage which allows the reading of the level within wide limits and especially if the level is near the bottom of the container.

Another object of the invention is to provide a gage which consists of very few but strong parts which may be easily attached and detached and having only wide passages for the liquid which are not easily clogged and which allow the reading of the level from a distance and from any side.

A still further object of my invention consists in providing a gage which may be cleaned without having to empty the containers. The new device serves not only as a gage but it may be used for filling in the liquid in the container or for emptying the same.

With these and other objects in view I provide a device having a glass tube with one or more lateral openings which tube may be fastened to the outer wall of the container either by means of a nipple or the like or which may be pressed thereon without any intermediate piece, in such a manner that one or more of the lateral openings are in communication with the liquid-container.

Other features of the invention reside in the form of the parts for mounting the gage and in the arrangements and combinations of the various parts, all of which will be more fully described in connection with the accompanying drawings, in which—

Figures 1 to 6 show each a sectional elevation of a form of the new gage.

In Fig. 1, 2 denotes a receptacle of liquid. The side wall of receptacle 2 is provided with a hole 3 arranged flush with the bottom of the receptacle. On the outside of the side wall a gage glass 1 is fitted, which glass is pressed against the side wall by means of a screw bolt 6 screwed into the side wall.

The gage is held tight by means of packings 7 arranged between the face of the gage glass 1 and the side wall 2 on the one side and between the bead of the bolt 6 and the gage glass 1 on the other side. The gage 1 is provided with a hole 4 at its top or it may be connected to the receptacle 2 by means of a pipe 5 as shown in dotted lines to make the pressure in the gage 1 equal to that in the receptacle 2. The gage 1 therefore indicates always the true level and the latter can be seen clearly from any side and from the distance. The means for attaching the gage to the receptacle 2 may be different as shown. The gage 1 shows the level even if the same is near the bottom of the receptacle 2.

The construction shown in Fig. 2 comprises a tube 11 of transparent material for instance glass which is open at its top and which is provided at its lower end with two lateral openings. The tube 11 is arranged on a bolt 15 which is screwed into a receptacle 17 containing the liquid by means of the screw threaded part 16. The bolt 15 has a longitudinal bore 21 and cross borings 18. The bolt 15 is provided with internal screw threads 14 and holds a screw 19 by means of which the tube 11 is tightly pressed against a shoulder of the bolt 15. Between the tube 11 on the one hand and the head of screw 19 and the shoulder of the bolt 15 on the other hand packings 20 are arranged. The cross borings 18 are arranged in such a manner that they may be closed by the screw 19 if the tube 11 is removed. If therefore by accident the tube 11 is broken the outflow of the liquid through the bolt 15 may be prevented by screwing in screw 19 until it closes the borings 18. The tube 11 is rotatable on bolt 15 and may be used for emptying the receptacle. On the top of tube 11 a cap 12 is placed having an air hole 13. The tube 11 is secured by a holder 22 fixed to the receptacle 17 which prevents the tube 11 from being displaced by accident.

The gage shown in Fig. 3 comprises a tube 31 which is mounted on a bolt 34. The tube 31 is held by a ring 33 having internal screw-threads and being screwed on the bolt 34 which is provided with screw-threads on its outer surface. The bolt 34 which has a longitudinal boring 36 and cross borings 32 is closed by a nut 35. By unscrewing nut 35 the receptacle may be emptied through the bore 36 without taking the tube 31 from the bolt 34.

Fig. 4 shows another form of the new gage. The tube 41 is provided at its lower end with two lateral openings through which the shaft of a hollow bolt 43 projects. The bolt 43 is provided at its one end with a hexagonal head and on the other end with screw threads by means of which the bolt 43 is screwed into a boss 46 of the receptacle 42. Between the head of the bolt 43 and the tube 41 and between the latter and the boss 46 packing-rings 45 are arranged. The bolt 43 is provided with a longitudinal and with several cross borings. The longitudinal boring is closed at its outer end by means of a screw 43. By unscrewing the screw 43 the receptacle 42 may be emptied through the bore of bolt 43.

Fig. 5 shows a gage according to my invention having a tube 51 with only one lateral opening arranged in a socket of the tube 51. The tube 51 is pressed against the side wall 54 of the receptacle containing the liquid by means of a spring 52. The spring 52 is fastened with one end to the receptacle and the free end rests on the lower end of the tube 51. Between the side wall 54 and the tube 51 I arrange a packing ring 55 around the hole 53 of the wall 54.

The tube of the gage may be shaped as shown in Fig. 6. The lower end of the tube 61 is bent-off at a right angle and is tightly fixed in a ring 62 by means of suitable packing material. The ring 62 is screwed on to the wall 63 of a liquid-container. Other means may be used for connecting the tube 61 with the liquid container 63.

In combination with the gage a valve, cock, etc., may be used for instance the plug 19 may be replaced by a cock screwed into the bolt 15 and so on.

The gage according to my invention has the advantage that the level is visible from the bottom to the top and from any side, there being no parts of the transparent gage which are covered by metallic parts. All channels, borings, etc., through which the liquid has to pass are wide and are not easily clogged. The height of the gage glass may be easily varied according to requirements by cutting the tube to the proper length. The gage may easily be cleaned on its inside and on the outside.

Also I have shown some of the preferred constructions of my new liquid gage I would point out that various changes in the form and construction of the parts of the gage may be made without departing from the spirit of my invention.

What I claim and wish to secure by Letters Patent is:

1. A liquid gage comprising in combination a tube having an opening at its top, and two sockets at the lower end, a hollow bolt passing through said sockets, means to fix said tube on said bolt and means for attaching said bolt on the liquid container.

2. A liquid gage comprising in combination a tube having an opening in its top, and two sockets at the lower end, a hollow bolt passing through said sockets provided with cross borings, a nut adapted to hold said tube on said bolt, and adapted to close said cross borings substantially as described and for the purpose set forth.

3. A liquid gage comprising in combination a tube having an opening in its top, and two sockets at the lower end, a hollow bolt passing through said sockets provided with cross borings, a nut adapted to hold said tube on said bolt, a cap screwed on said bolt closing the boring of the shaft substantially as described and shown and for the purpose set forth.

4. A liquid gage comprising in combination, a translucent tube open at the top and closed at the bottom, with lateral openings intermediate its ends for the introduction of the liquid, and a bolt passing through said openings adapted to secure said gage to a liquid container.

In testimony whereof I affix my signature in presence of two witnesses.

FRANZ HUNZIKER.

Witnesses:
CHARLES FISCHER,
ELIAS SCHULER.